(12) United States Patent
Argote et al.

(10) Patent No.: US 9,982,607 B2
(45) Date of Patent: May 29, 2018

(54) SHAFT FAILURE DETECTION USING PASSIVE CONTROL METHODS

(71) Applicant: Rolls-Royce North American Technologies, Inc., Indianapolis, IN (US)

(72) Inventors: Christopher Argote, Indianapolis, IN (US); John K. Harvell, Indianapolis, IN (US); Arthur L. Rowe, Littleover Derby (GB)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 264 days.

(21) Appl. No.: 15/149,256

(22) Filed: May 9, 2016

(65) Prior Publication Data

US 2017/0022907 A1   Jan. 26, 2017

Related U.S. Application Data

(60) Provisional application No. 62/194,582, filed on Jul. 20, 2015.

(51) Int. Cl.
*F02C 9/56* (2006.01)
*F01D 21/04* (2006.01)
(Continued)

(52) U.S. Cl.
CPC ............... *F02C 9/56* (2013.01); *F01D 21/04* (2013.01); *F02C 7/262* (2013.01); *F02C 9/28* (2013.01);
(Continued)

(58) Field of Classification Search
CPC .... F02C 9/56; F02C 7/262; F02C 9/28; F01D 21/04; F05D 2270/303; F05D 2270/02; F05D 2270/3015
See application file for complete search history.

(56) References Cited

U.S. PATENT DOCUMENTS 5,628,185 A  5/1997 Rowe
6,619,027 B1  9/2003 Busch
(Continued)

FOREIGN PATENT DOCUMENTS

EP   2 249 004 A2   11/2010

OTHER PUBLICATIONS

European Search Report corresponding to European Application No. 16172890.2, dated Dec. 12, 2016 (7 pages).

*Primary Examiner* — Thomas Ingram
(74) *Attorney, Agent, or Firm* — Maginot, Moore & Beck, LLP (57) ABSTRACT

A method for use in a turbine control system includes controlling fuel supply to a gas turbine engine at least in part using a fuel supply limit determined as a first function of a rotational speed of a shaft of the gas turbine engine. The method also includes obtaining a first value representative of a rotational speed of the shaft, and differentiating the first value within a processing unit. The processing unit determines an adjusted fuel supply limit as an adjusted function of the first value. The adjusted function is based on the first function and the differentiated first value. The method further includes controlling the fuel supply to the gas turbine engine at least in part using the adjusted fuel supply limit.

14 Claims, 7 Drawing Sheets

(51) Int. Cl.
*F02C 9/28* (2006.01)
*F02C 7/26* (2006.01)
*F02C 7/262* (2006.01)

(52) U.S. Cl.
CPC .... *F05D 2270/02* (2013.01); *F05D 2270/303* (2013.01); *F05D 2270/3015* (2013.01)

(56) References Cited

U.S. PATENT DOCUMENTS

| | | |
|---|---|---|
| 6,915,639 B1 | 7/2005 | Linebrink |
| 7,043,896 B2 | 5/2006 | Matthews |
| 7,100,378 B2 | 9/2006 | Matthews |
| 7,246,495 B2 | 7/2007 | Muramatsu et al. |
| 7,934,367 B2 | 5/2011 | Mons |
| 8,224,552 B2 | 7/2012 | Van Vactor et al. |
| 8,321,119 B2 | 11/2012 | Van Vactor et al. |
| 8,904,804 B2 | 12/2014 | Tezuka et al. |
| 2001/0000090 A1 | 4/2001 | Thompson et al. |
| 2011/0041510 A1 | 2/2011 | Sasaki et al. |
| 2013/0152600 A1* | 6/2013 | Rowe ................ F01D 17/04 60/779 |

* cited by examiner

SHAFT FAILURE DETECTION USING PASSIVE CONTROL METHODS

This application claims the benefit of priority of U.S. provisional application Ser. No. 62/194,582 filed on Jul. 20, 2015, the disclosure of which is herein incorporated by reference in its entirety.

FIELD OF THE INVENTION

This invention relates to a gas turbine engine fuel control methods and related apparatus.

BACKGROUND OF THE INVENTION

A gas turbine engine fundamentally consists of one or more compressors, combustion chambers, and one or more turbines, all displaced along an axis of rotation. Shafts connect the turbines to corresponding compressors, thereby providing a mechanism to transmit the mechanical power required to operate the compressor. In many engines, including those used in aircraft, at least one shaft connects one of the turbines to a fan that provides propulsive thrust to the aircraft.

One rare mode of failure in a gas turbine engine is a failure of one or more of the shafts. When one of the shafts fails, the load on the turbine driving the shaft can be substantially reduced, thereby resulting in a turbine overspeed. The turbine overspeed can undesirably result in disc burst or high energy blade release. Accordingly, the industry has developed strategies for addressing the risk of disc or blade release failures subsequent to a shaft failure.

In the past, mechanical and/or electrical sensing techniques have been used to detect a shaft failure. Control mechanisms have been used to cut off the fuel supplied to the engine based on the detected failure. However, care must be taken to ensure that the fuel supply is cut off early enough to avoid or at least substantially reduce the possibility of liberation of high energy debris. Accordingly, early shaft failure detection schemes may be employed. However, because purposely cutting off fuel to an engine is normally undesirable, the engine control systems must not prematurely react before a shaft failure is confirmed. Observable phenomena that occur during shaft failure can also occur due to other factors in which cutting off fuel to the engine would be undesirable.

As a consequence, there is a need for additional protections against high energy debris release upon shaft failure that also reduces the likelihood that the fuel supply is cut off to a healthy engine that has not had a shaft failure.

SUMMARY OF THE INVENTION

It is an object of the present invention to provide a gas turbine engine having additional protections against the negative consequences of shaft failure.

In at least some embodiments, the above described object is achieved by a control scheme that employs extensions of current control methods to quickly detect potential shaft failure signatures and perform graduated corrective action upon initial detection. The use of graduated corrective action allows for immediate mitigation even before shaft failure has been fully confirmed.

A first embodiment is a method for use in a turbine control system that includes controlling the fuel supply to a gas turbine engine at least in part using a fuel supply limit determined as a first function of a rotational speed of a shaft of the gas turbine engine. The method also includes obtaining a first value representative of a rotational speed of the shaft, and differentiating the first value within a processing unit. The processing unit determines an adjusted fuel supply limit as an adjusted function of the first value. The adjusted function is based on the first function and the differentiated first value. The method further includes controlling the fuel supply to the gas turbine engine at least in part using the adjusted fuel supply limit.

This embodiment effectively adjusts the model for the fuel supply limit as a function of a sudden change in rotational speed. Using the adjusted model, the amount of fuel supplied to the engine can be even more greatly reduced as the rotational speed of the turbine increases than it would have been under the normal operational model. This additional reduction thus offers greater protection in the event of a shaft failure than would have been possible using the normal fuel supply limit model whilst ensuring no risk of spurious shutdown.

Another embodiment involves adjusting a fuel supply derate value that is otherwise used to protect a gas turbine engine upon fast windmill restart. In sensed conditions within the range normally associated with fast windmill restart, the fuel supply derate value is calculated as previously known. In more extreme sensed conditions found to be more likely associated with a shaft failure, the fuel supply derate value is increased.

In yet another embodiment, a model for estimating rotational speed in the absence of a properly operating speed sensor includes an adjusted portion that artificially lowers the estimated speed. The adjusted portion of the model coincides with conditions associated with possible shaft failure. The artificially lowered estimated speed (in possible shaft failure conditions) can be combined with other existing control operations that otherwise reduce fuel when a low engine speed is detected. By artificially reducing the estimated speed, the fuel reduction of existing control operations is accelerated.

The above-described features and advantages, as well as others, will become more readily apparent to those of ordinary skill in the art by reference to the following detailed description and accompanying drawings.

BRIEF DESCRIPTION OF THE DRAWINGS

The present invention will now be described, by way of example, with reference to the accompanying drawings in which.

DETAILED DESCRIPTION OF THE INVENTION

Figure 1:
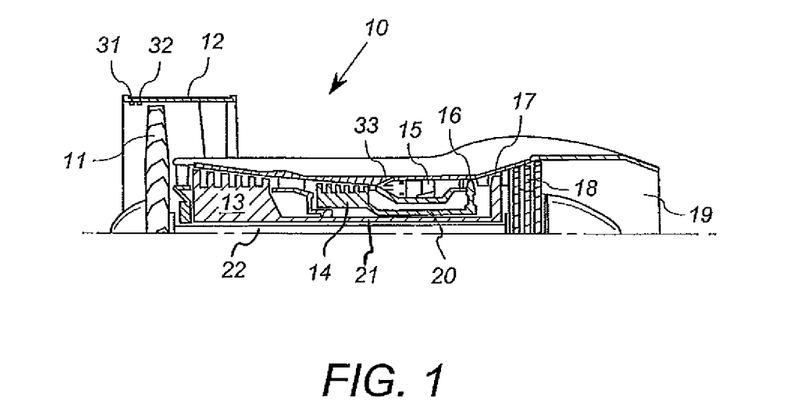
FIG. 1 shows a sectioned side view of the upper half of a gas turbine engine in accordance with the present invention.

FIG. 1 shows a representative, fragmentary cross-section of a ducted fan gas turbine engine generally indicated at 10. Only the top half of the engine 10 is illustrated for clarity of exposition. As shown in FIG. 1, the engine 10 comprises a fan 11 contained within a fan duct 12, intermediate and high pressure compressors 13 and 14 respectively, combustion apparatus 15, high, intermediate and low pressure turbines 16, 17 and 18 respectively and an exhaust nozzle 19. A first shaft 20 couples the high pressure turbine 16 to the high pressure compressor 14, a second shaft 21 couples the intermediate pressure turbine 17 to the intermediate pressure compressor 13, and a third shaft 22 couples the low pressure turbines 18 to the fan 11.

The gas turbine engine 10 functions in the conventional manner so that air drawn into the engine 10 by the fan 11 is divided into two flows. The first flow is exhausted through the fan duct 12 to provide propulsive thrust. The second flow is directed into the intermediate pressure compressor 13 where compression of the air takes place. The air then passes into the high pressure compressor 14 where additional compression takes place prior to the air being directed into the combustion apparatus 15. There the air is mixed with fuel and the mixture combusted. The resultant combustion products then expand through, and thereby drive, the high, intermediate and low pressure turbines 16, 17 and 18 respectively before being exhausted through the nozzle 19 to provide additional propulsive thrust.

The shafts 20, 21 and 22 are hollow and concentric, and transmit torque from the turbine sections 16, 17 and 18 to components 14, 13 and 11, respectively.

As also shown in FIG. 1, the gas turbine engine 10 includes a pressure sensor 31 operably coupled to the fan duct 12 upstream of the fan 11 to measure an inlet pressure value P20. Other similar pressure sensors, not shown, are positioned in same axial location but at different annular positions. Similarly, the gas turbine engine 10 includes a temperature sensor 32 operably affixed to the fan duct 12 upstream of the fan 11 to measure the inlet temperature T20. Other similar temperature sensors, not shown, are positioned in same axial location but at different annular positions. Furthermore, the gas turbine engine 10 includes a pressure sensor 33 operably coupled to an inlet of the combustion chamber 15 to measure the pressure P30 at the outlet of the high pressure compressor 14. Other similar pressure sensors, not shown, are positioned in same axial location but at different annular positions.

Figure 2:
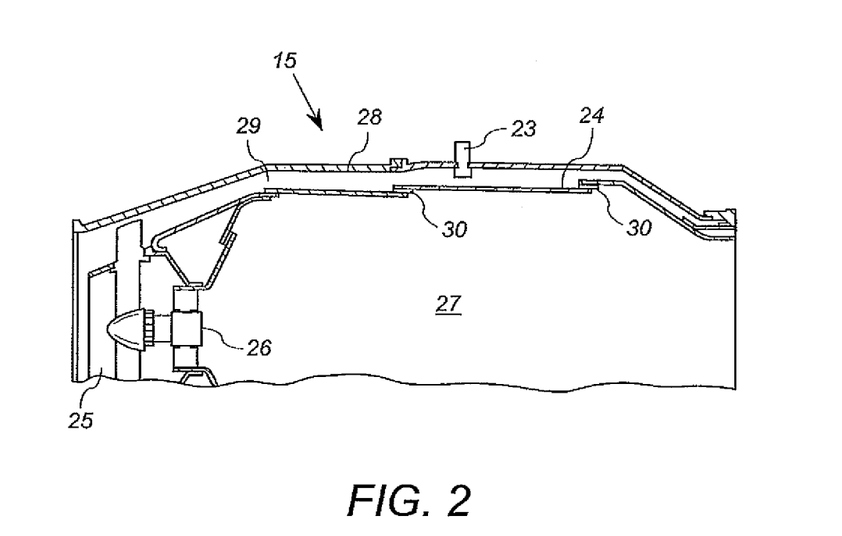
FIG. 2 is a sectioned side view of a portion of the combustion apparatus of the gas turbine engine shown in FIG. 1.

FIG. 2 shows a fragmentary cutaway view of the upper half of the combustion apparatus 15. The combustion apparatus 15 is of generally conventional configuration comprising an annular combustion chamber 24 having a plurality of air inlets 25 at its upstream end. A fuel injector 26 is provided in each air inlet 25 to direct fuel into the combustion chamber interior where the combustion process takes place.

The combustion chamber 24 is surrounded in radially spaced apart relationship by a part 28 of the casing of the engine 10. The thermocouple 23, which is one of three such similar thermocouples, is located in the casing part 28 so as to protrude into the annular space 29 defined between the casing part 28 and the combustion chamber 24. The remaining two thermocouples (not shown) are similarly located to protrude into the annular space 29 so that all three thermocouples are equally circumferentially spaced apart from each other. The thermocouples 23 measure the temperature T30 of the air which operationally flows through the annular space 29 in order to provide cooling of the combustion chamber 24. Apertures 30 in the combustion chamber 24 wall permit air from the space 29 to flow into the combustion chamber 27 to provide further cooling and to take part in the combustion process.

The air which flows into the annular space 29 is part of the air flow exhausted from the high pressure compressor 14 and most of it flows into the combustion chamber 24 through its apertures 30. The remainder of the air flows, as previously stated, into the combustion chamber 24 through its upstream end air inlets 25. Consequently the air flowing through the annular space 29 is representative, in terms of the temperature, of the air which is exhausted from the downstream end of the high pressure compressor 14. Therefore, the output signal T30 from the thermocouple 23 will be representative of that air temperature.

Figure 3:
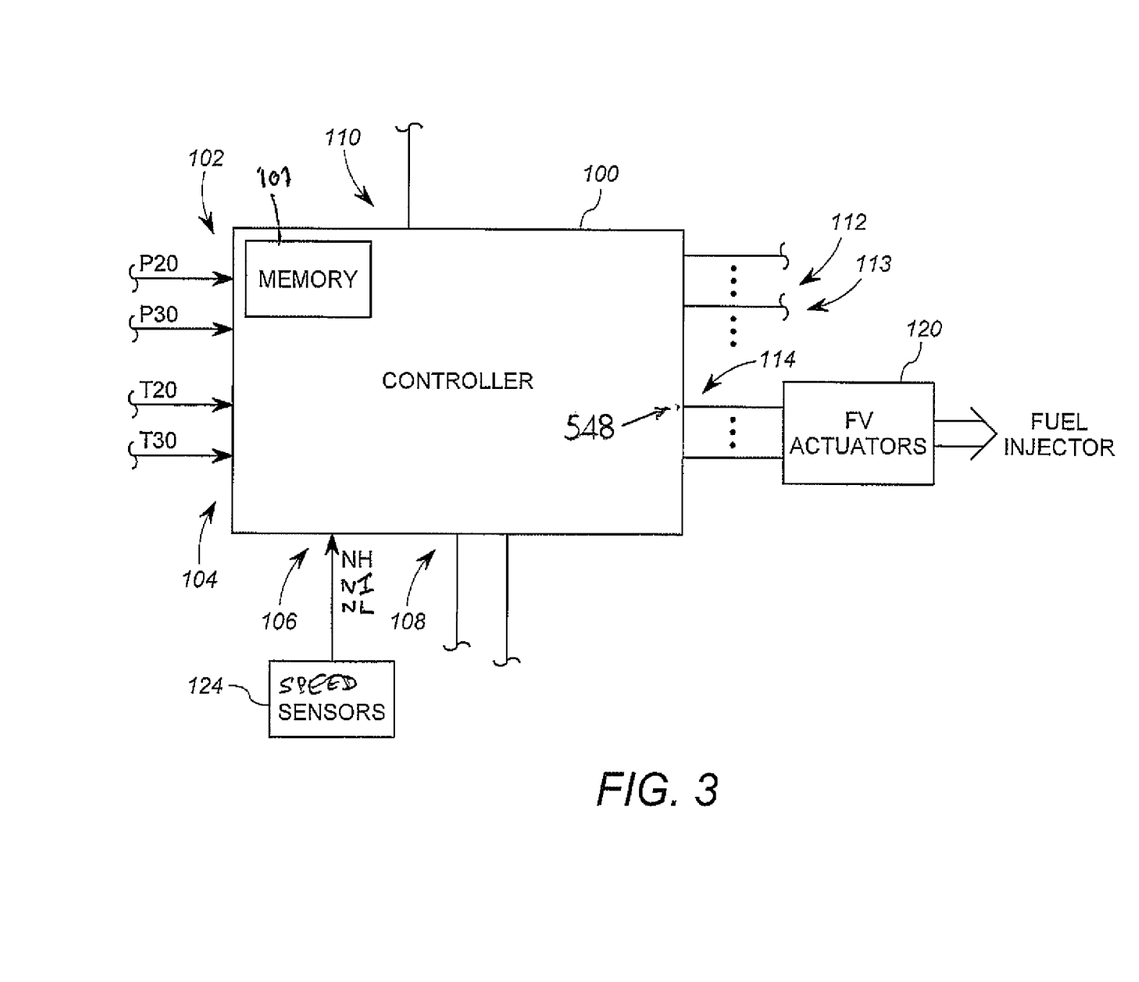
FIG. 3 is a schematic diagram of a controller that may be used in a fuel control system of the gas turbine engine shown in FIG. 1.

Speed control of the gas turbine engine 10 is carried out primarily through the control of fuel to the combustor apparatus 15. To this end, FIG. 3 shows a schematic representation of a controller 100 for the gas turbine engine 10, located on the aircraft, not shown, in which the gas turbine engine 10 is located. The controller 100 includes processing elements configured to control the amount of fuel delivered to the engine 10 as a function of various inputs. As will be discussed below, these inputs can include the temperature values T20, T30, and pressure values P20, P30, among others.

In at least some embodiments, the controller 100 includes a digital processor. In such cases, the controller 100 also includes a memory 101 that stores control programs and/or software that carry out the operations attributed to the controller 100 herein. The memory 101 may be any suitable memory device, or combination of memory devices, such as RAM and/or non-volatile memory devices. It will be appreciated that the controller 100 may suitably include digital and/or analog components.

For control of fuel feed rate, among other things, the controller 100 includes pressure sensor inputs 102, temperature sensor inputs 104, engine speed sensor inputs 106, other sensor inputs 108. The controller 100 may also include a set point input 110 for receiving a signal indicative of a desired aircraft speed (or desired acceleration/deceleration) and/or a desired engine speed corresponding to a desired aircraft speed. The controller 100 may also include bleed valve control outputs 112, variable stator vane actuation outputs 113, and fuel metering valve outputs 114.

In general, the controller 100 employs the various inputs 102, 104, 106, 108 and 110 to generate control signals for the bleed valve control outputs 112, variable stator vane outputs 113, and the fuel metering valve outputs 114. The bleed valve control outputs 112 are operably connected to one or more bleed valves, not shown, but which are used to redirect air from the engine to other components of the engine 10 and/or aircraft for various reasons known in the art. The control of bleed valves is well known. The speed sensor inputs 106 are operably connected to speed sensors 124. The speed sensors 124 are operably connected to detect the rotational speed of one or more of the shafts 20, 21, 22 and/or turbines 16, 17 and 18 or other hardware connected to the rotating shafts. In one embodiment, the speed sensors 124 provide measurements NH, NI, and NL of rotational speeds of the respective shafts 20, 21 and 22.

The fuel metering valve outputs 114 are operably coupled to fuel valve actuators 120 that control the amount of fuel delivered to the combustion apparatus 15 of FIGS. 1 and 2 via the fuel injectors 26. The general control of fuel metering valves to achieve desired aircraft and/or engine speed is known in the art. In addition to using the fuel control to modulate engine thrust, there exist other fuel supply control schemes that operate under abnormal circumstances. For example, the fuel supply can be controlled to limit or avoid stalling upon restart of the engine. Other necessary control schemes for "surge" and other conditions are known.

In accordance with at least some embodiments of the present invention, certain existing control schemes are modified or altered to perform a separate function of providing early detection and remediation of a possible shaft failure scenario (failure of any of the shafts 20, 21 and 22). Preferably, these schemes are implemented in conjunction with the prior art protection scheme of shutting off the fuel to the engine upon conventional detection of a shaft failure. Thus, the modified control schemes discussed herein perform a preliminary protective operation prior to conventional detection of shaft failure. In the event that shaft failure is ultimately detected, the preliminary protective operation helps reduce the possibility of disc burst prior to conventional detection of the shaft failure. In the event that the shaft has not failed, then the engine 10 may recover and premature shut down of the engine is avoided.

Figure 4A:
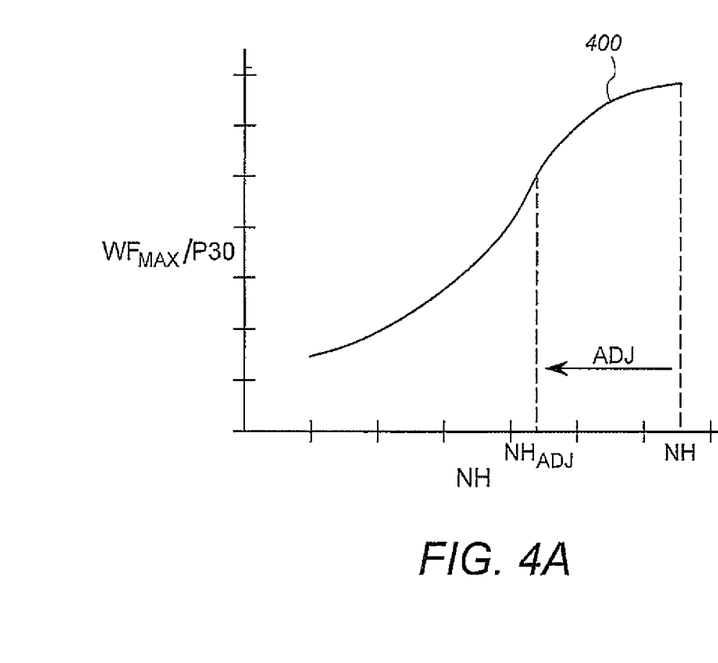
FIG. 4A shows a graphical representation of the fuel supply limit model with a vertical axis representative of the maximum fuel level and the horizontal axis representative of rotational shaft speed.
Figure 4B:
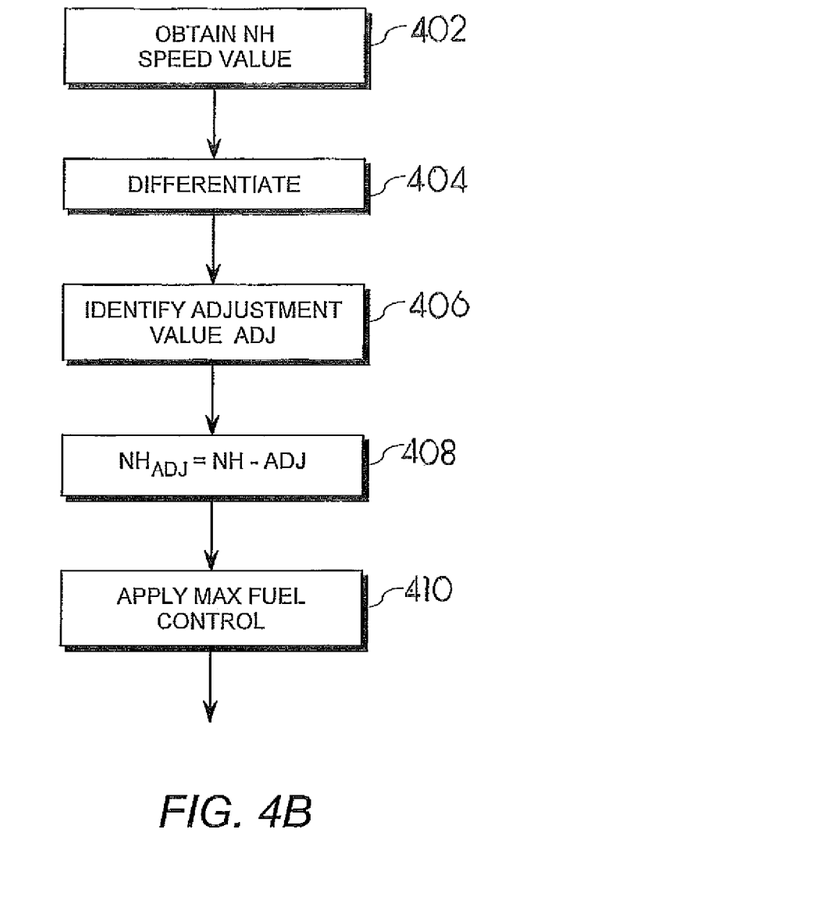
FIG. 4B shows a flow diagram of operations performed by the controller of FIG. 3 in accordance with at least one embodiment.
Figure 4C:
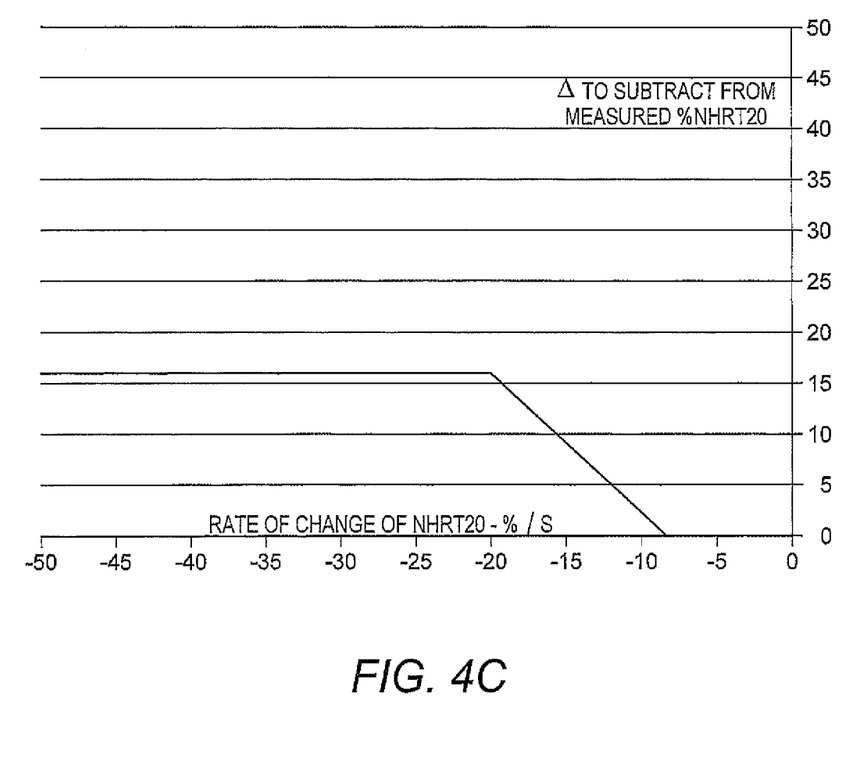
FIG. 4C shows a graphical representation of the relationship between a fuel supply limit adjustment and change in rotational speed.

In the current embodiment and referring generally to FIGS. 4A, 4B and 4C, one of the known control schemes monitors the rotational speed NH of shaft 20 to employ a maximum fuel level WFmax based on that shaft speed. Those of ordinary skill in the art will recognize that a similar approach which monitors rotational speed NL, shaft 22, or NI, shaft 21, can be used in a similar fashion to control a maximum fuel flow level. In particular, under normal circumstances, the controller 100 employs a fuel supply limit as a function of speed to limit compressor operating line migration during engine transients. In particular, it is known to employ an upper limit on fuel supply at lower speeds to prevent problems during engine start. As will be discussed below, one embodiment of the invention performs an adjustment on the operation of the fuel supply limit function based on the possible detection of a shaft break.

In particular, FIG. 4A shows a graphical representation of the fuel supply limit model 400 with the vertical axis representative of the maximum fuel level as a function of pressure of the air exhausted from the high pressure compressor, $WF_{max}/P30$, and the horizontal axis representative of rotational shaft speed NH. The speed NH is obtained from speed sensors 124, which may suitably be disposed just in front of the HP shaft thrust bearing, not shown, at the front of the high pressure compressor 14. However, in other applications, the speed sensor 124 may be placed in an accessory gearbox, not shown, but which would be known to those of ordinary skill in the art, where the speed sensor 124 is operably coupled to measure speed from a driven component, for example, a permanent magnet generator (PMG). In accordance with an embodiment of the present invention, however, this known model 400 may be adjusted upon detection of a possible shaft break.

To this end, a shaft break is typically characterized by a sudden decrease in rotational speed of the compressor and released hardware (due to the disconnection of the shaft from the drive/turbine). In the detection of an unusually sudden decrease in rotational speed NH, the controller 100 effectively adjusts the NH value used to determine $WF_{max}$ in the model 400 depicted in FIG. 4A. The controller 100 preferably stores information representative of the model 400 in memory 101.

FIG. 4B shows an exemplary set of operations that may be carried out by the controller 100 to implement this operation. In step 402, the controller 100 obtains the rotational speed value NH from the sensor(s) shown in FIG. 3. In step 404, the controller 100 differentiates the value NH to obtain the value $\delta$NH. The differentiation may be carried out digitally or via analog processes. In step 406, the controller identifies any adjustment value ADJ that corresponds to the value $\delta$NH. To this end, the graph of FIG. 4C may be employed, which shows ADJ as a function of reduction of $\delta$NH. Information representative of the relationship depicted in FIG. 4C may also be stored in memory 101.

In step 408, the controller 100 employs the ADJ value to modify the perceived NH speed and thereby reduces the maximum fuel limit function 400 of FIG. 4A. To this end, for example, the controller 100 may suitably subtract the adjustment value ADJ from the actual speed value NH to obtain an adjusted speed value $NH_{ADJ}$, and identify the value $WF_{max}$ that corresponds with the value $NH_{ADJ}$ using the function 400 of FIG. 4A. As shown in FIG. 4A, this adjustment results in a lower $WF_{max}$ than would normally occur at the speed NH. The controller 100 thereafter in step 410 controls the fuel supplied to the fuel valve actuators 120 using the maximum fuel limit value $WF_{max}$ identified in step 408.

It can be seen from FIGS. 4A and 4C, that sudden and severe decrease in speed NH will result in a bigger value of ADJ. As a consequence, the reduction in the fuel supply limit $WF_{max}$ is accelerated.

It will be appreciated that the flow diagram of FIG. 4B merely illustrates the generalized operations carried out by the controller 100 to perform the preliminary shaft failure detection and remediation, and is not intended to define the detailed software (or hardware) operations of the controller 100. In any event, the operations of FIG. 4B are repeated in an ongoing manner, which allows for possible recovery if the speed value NH recovers. If a shaft failure is subsequently detected by other, conventional means, then the controller 100 may completely cut off the fuel supply.

Thus, the controller 100 in this embodiment first obtains a first value (e.g. NH) representative of a rotational speed of one or more of the shafts of a turbine. The controller 100 differentiates the first value to obtain the rate of change. The controller 100 then adjusts the model of FIG. 4A based on the differentiated first value. The controller 100 thereafter carries out its normal control mechanisms, such as controlling fuel supply based on the adjusted version of NH based on the model in FIG. 4A.

By adjusting the model, it is meant that the controller 100 may suitably move the speed value back (or curve of FIG. 4A forward) by a value corresponding to the differentiated first value. Thus, when the shaft speed NH exhibits rapid deceleration, the curve 400 will effectively move to the right by a value corresponding to the deceleration rate. This results in the fuel supply limit being even lower (at any particular rotational speed NH) than would result from normal operation at that rotational speed NH.

In yet another embodiment of the invention, another known control feature may be manipulated to provide a preliminary detection and response to a possible shaft break. In particular, the controller 100 in this embodiment employs a known control scheme that limits the amount of fuel that can be supplied to an engine upon restart. In particular, it is known that an in-flight restart of a gas turbine engine, referred to as a fast windmill restart, can cause issues due to residual heat in components within the engine. Thus, it is known to control the fuel supply such that during conditions indicative of a fast windmill restart, the amount of fuel is limited to the engine. The details of an exemplary embodiment of this control scheme are shown and discussed in U.S. Pat. No. 5,628,185.

In this embodiment of the present invention, the start bias control scheme is modified to provide even further fuel feed reduction when excessively high temperatures, those typically not associated with fast windmill restart, are detected. Such excessively high temperatures can be indicative of a shaft failure. Accordingly, the modified start bias control scheme provides early detection and mitigation of a possible shaft failure without completely shutting off the fuel.

Figure 5:
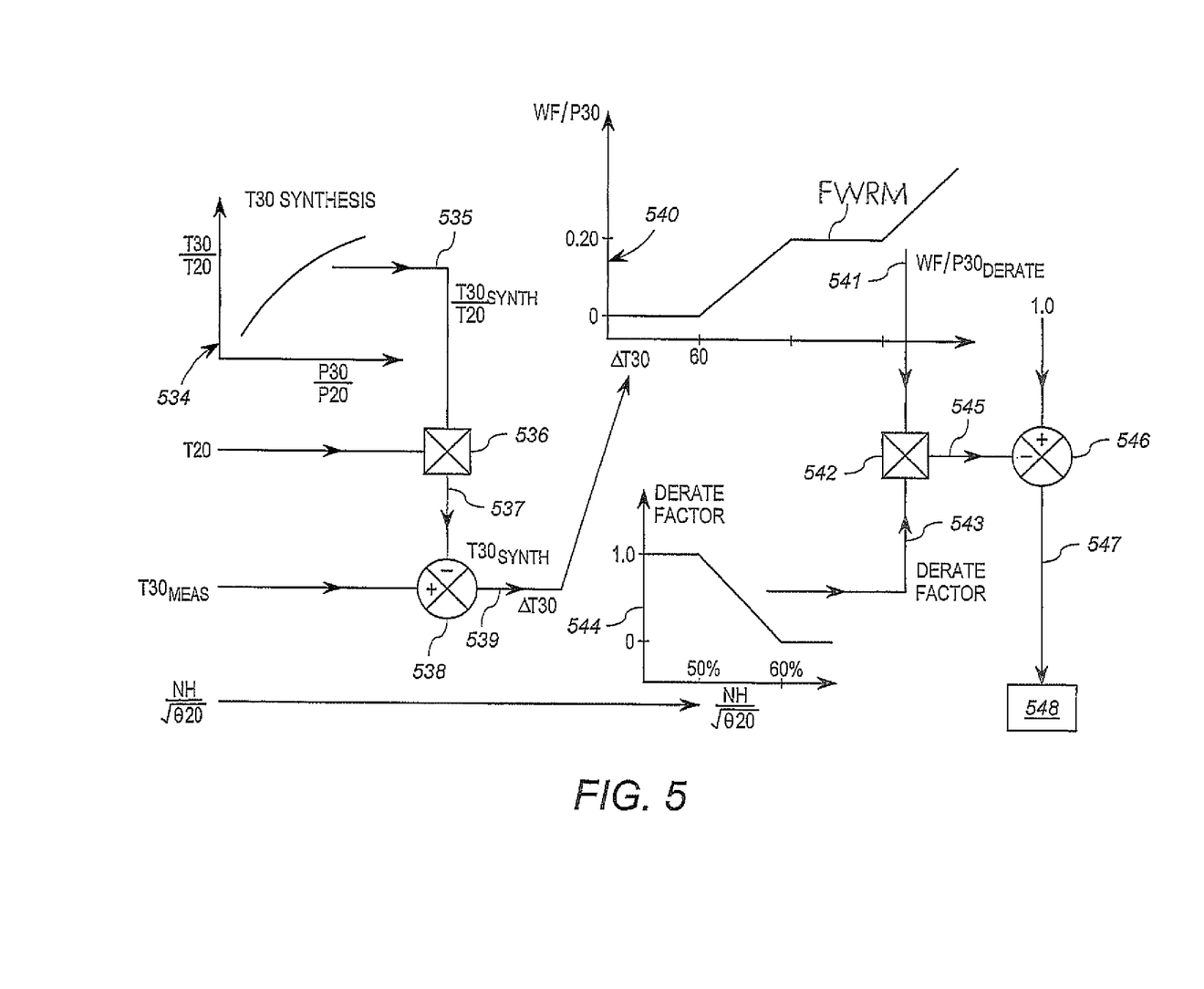
FIG. 5 shows a functional flow diagram of a control scheme for limiting fuel under conditions of fast windmill restart and potential shaft failure employed by the controller of FIG. 3 in another embodiment.

Referring to FIG. 5, a modified version of the start bias control scheme described in U.S. Pat. No. 5,628,185, which is incorporated by reference, is shown. In general, the control scheme of FIG. 5, which is carried out by the controller 100, provides start bias (fuel modifier) control similar to that of the prior art, but also provides early detection and response to a possible shaft failure. In general, if an engine stall occurs, then the controller 100 reduces the fuel to a degree which will avoid overheating issues as the engine restarts and begins to push cooler fresh air through the heated components. If, however, conditions indicate that a shaft 20, 21, 22 may have failed, then the controller 100 reduces the fuel to a greater degree to reduce the probability of disc burst or high energy blade release. Nevertheless, the fuel is not completely cut off and the engine 10 may recover if it is ultimately determined that the shaft has not failed.

Referring now to FIG. 5, the actual temperature T30 of the air exhausted from the high pressure compressor 14 is monitored by a plurality of thermocouples, one of which 23 can be seen adjacent to the combustion apparatus 15 if reference is now made to FIG. 2. If the theoretical expected output signal of the thermocouples 23 in a given situation is designated $T30_{synth}$, then $$T30_{synth}/T20=F(P30/P20)$$

This relationship is depicted as 534 in FIG. 5. This processing of the input signals T20, P30 and P20 provides an output signal 535 of $T30_{synth}/T20$. That output 535 is then processed by the multiplication unit 536 which also has T20 as an input signal to provide an output signal 537 which is representative of $T30_{synth}$. The $T30_{synth}$ output signal 537 is then directed to a summing and subtraction unit 538 which is adapted to provide an output signal 539 which equals the difference between two input signals. The second input signal to the unit 538 is the output signal T30 of the thermocouples 23, which is representative of the actual temperature of the air exhausted from the downstream end of the high pressure compressor 14. The output signal from the thermocouple 23 is designated $T30_{meas}$. Thus the output signal 539 of the unit 538 which is designated ΔT30, equals $T30_{meas}-T30_{synth}$.

The signal ΔT30 is therefore representative of the difference between the actual temperature of the air exhausted from the downstream end of the high pressure compressor 14 and the theoretical temperature of the air which would be expected under normal engine running conditions. As will be discussed below, within a first range of values, this differential could be due to temperature increase resulting from a compressor stall. However, within a second range of values, a much greater difference could be due to a temperature increase and other parameter changes that are indicative of a shaft failure.

Referring again specifically to FIG. 5, the ΔT30 signal 539 is employed to determine a fuel derate value, $WF/P30_{derate}$, as depicted in the relationship at 540. WF is representative of the rate of flow of fuel to the engine 10 and P30 is, as previously stated, representative of the pressure of the air exhausted from the high pressure compressor 14.

The derate value relationship depicted at 540 is selected such that if ΔT30 does not exceed a minimum threshold, then there is no $WF/P30_{derate}$ output. However, if ΔT30 exceeds the minimum threshold, then there is a $WF/P30_{derate}$ output signal 541 which increases with ΔT30 up to an intermediate maximum or constant derate value. The minimum to maximum threshold range represents the probable range relating to a restart after an engine stall (called a quick windmill relight) or other low idle condition. In accordance with the present invention, however, if ΔT30 further exceeds the maximum threshold, then the $WF/P30_{derate}$ signal increases even further. The choice of this threshold for the start of the second range of increase may be altered, but in general is intended to exceed any change in compressor temperature typically associated with quick windmill restart.

The $WF/P30_{derate}$ signal 541 is then directed into a multiplication unit 542 which multiplies the signal 541 by a derate factor signal 543. The derate factor signal 543 is derived from a relationship depicted at 544 between derate factor and $NH/\sqrt{\theta 20}$ which is an expression representative of the speed of rotation of the engine 10. Essentially, if the rotational speed of the engine is less than 50% of what it should be under cruise conditions, then the derate factor is 1. Consequently, under these circumstances the output signal 545 of the multiplication device is the same as the input signal 541 which is $WF/P30_{derate}$. However, as the engine speed increases to 60% of cruise, the derate factor 543 progressively decreases to zero. Consequently, if the speed of the engine 10 is greater than 60% of cruise speed (where 60% NH is representative of the minimum idle speed for the representative application), the output 545 from the multiplication unit 542 is set to zero.

The output 545 of the multiplication unit 542 is directed into a summing and subtraction unit 546 which subtracts the output 545 from 1.0 to provide a final output signal 547. The final output signal 547 is then directed to the main fuel control function 548 of the controller 100. The control function 548 then adjusts the normal fuel control signal provided to the FV actuators 120 of FIG. 3 by multiplying that signal by the final output signal 547.

It will be appreciated that the various "units" 536, 538, 542 and 546 may be simply mathematical operations carried out by a programmed processor within the controller 100, or may be carried out by analog circuitry. Similarly, it will be appreciated that information representative of the relationships 534, 540, and 544 may be stored in any suitable format (e.g. piece-wise linear equation, mathematical function, or look-up table) in memory 101 associated with the controller 100, shown in FIG. 3. Alternatively, the relationships may also be implemented purely in software steps.

In any event, during normal engine operating conditions in which the engine 10 is rotating at or above its idle speed (that is when $NH/\sqrt{\theta 20}$ is greater than 60%) the derate factor signal 543 will be zero and so, consequently will be the multiplication device output signal 545. This results in the final output signal 547 being 1.0 and therefore having no effect upon the operation of the main fuel control function 548.

However, if the engine 10, operating at or near full power conditions, is shut down and an immediate attempt is made to restart it, then air passing through the high pressure compressor 14 will be heated by the residual heat of the compressor 14 components. This, in turn will result in ΔT30 in the range of 60° K. to 300° K. As a result, the signal 539 increases to such an extent that a WHP30$_{derate}$ signal 545 will be dependent upon the rotational speed of the engine 10 and the magnitude of ΔT30. However, within that range, the fuel derate value WF/P30$_{derate}$ is limited to a maximum value FWRM for reasons discussed further below. In any event, the summing and subtraction unit 546 subtracts the output signal 545 from 1.0 to provide a final output signal 547. Since the final output signal 547 is now less than 1.0, it has an effect upon the operation of the main fuel control function 548 so that the rate at which fuel is supplied to the engine 10 is reduced by that proportion. The amount by which the rate of fuel supply is reduced is arranged to be sufficient to change the stall characteristics of the high pressure compressor 14. The stall characteristics are changed to such an extent that during the engine 10 restarting procedure, the high pressure compressor 14 does not stall, thereby in turn permitting effective engine 10 restarting.

As soon as an effective engine restart has been achieved, the engine rotational speed increases, thereby in turn increasing the value of NH/√θ20 so that the derate factor signal 543 decreases to zero. This in turn leads to the output signal 545 from the multiplication device 542 also decreasing to zero, thereby causing the final output signal 547 to return to its original value of 1.0. As a consequence of this, the main fuel control unit 548 reverts to supplying fuel to the engine 10 at a normal rate, thereby permitting normal engine operation.

One advantageous aspect of the control scheme of FIG. 5 is the alteration of the fuel rate to ΔT30 relationship 540 such that it has two distinct zones—one associated with fast windmill restart and the other associated with possible shaft failure. In the first zone (associated with fast windmill restart, the derate value increases at a first average rate as a function of the differential temperature value up until a point, at which point the derate value stays constant (or at least increases at lesser rate) for a range of differential temperature values. To this end, it has been found that over certain levels of fuel reduction, fast windmill restart can be hindered. Thus, as illustrated by the relationship 540, after increasing the WF/P30$_{derate}$ to a maximum value FWRM corresponding to a ΔT30 value of approximately 180°, the WF/P30$_{derate}$ remains at the same value throughout the rest of the range of temperatures associated with fast windmill restart. In the second zone, associated with possible shaft failure, the derate value increases again at a more aggressive average rate with respect to the differential temperature value. The more aggressive rate may be similar to the first average rate.

Thus, the Z-shaped curve of the relationship 540 allows for two-different control objectives to be obtained within the same control topology.

Thus, in another scenario, if the engine 10 is operating at or near full power conditions and a shaft fails, then air passing through the high pressure compressor 14 will be heated by the residual heat of the compressor 14 components to a greater degree. The value of ΔT30 would increase through the range of 60° K. to 180° K. into the range well beyond that associated with windmill restart. As the ΔT30 exceeds 300° K. (or other suitable range above that associated with fast windmill restart), the WF/P30$_{derate}$ signal 545 begins increasing again to even higher values, beyond the intermediate constant FWRM, further reducing the fuel rate. The controller 100 otherwise operates in the manner described above. It will be appreciated that in the case of a shaft failure, the NH/√θ20 value will decrease well below 50%, thereby providing a derate factor 543 of 1.0 in the relationship 544 of FIG. 5. This also accelerates the fuel rate reduction.

As with the other embodiments, when shaft failure is confirmed by other means, the controller 100 causes the fuel to be completely cut-off from the engine 10. If, however, a shaft failure has not occurred, and the ΔT30 is due other factors, then the engine 10 may gracefully recover without shutting off the fuel completely.

Both of the above reference embodiments rely on a moderately accurate speed signal NH to carry out their respective control operations.

It will be appreciated, however, that in many cases, and specifically those involving shaft failure, the shaft rotational speed sensor signal may not be available. In particular, shaft failure (and other events) can involve failure of the shaft rotational speed sensor 124. (See FIG. 3). Because rotational speed sensors can fail, it is known to employ logic in the controller 100 that estimates rotational speed NH based on other engine operating parameters. The controller 100 then uses the estimated speed for its control operations.

To this end, it is known to use a model of shaft speed based on various sensed parameters when a speed signal is not available. As will be discussed below in detail, an alteration of that model, which artificially reduces the estimated shaft speed for a portion of the model, can be used to carry out an early detection and remediation of a potential shaft failure.

Figure 6:
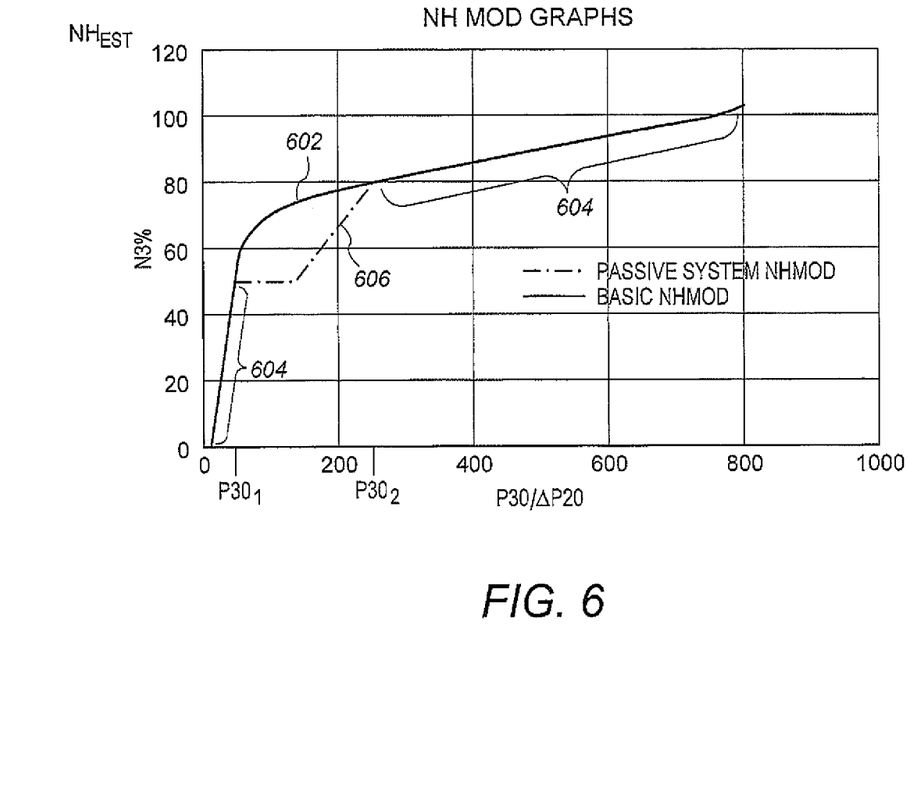
FIG. 6 shows a graphical representation of a modified model of rotational speed as a function of sensed engine parameters according to one or more embodiments.

FIG. 6 shows a model 600 of estimated rotational speed as a function of the sensed pressure value P30, which is obtained from the sensor 33 located near the inlet of the combustor 15. In particular, in the embodiment described here, the estimated speed NH$_{est}$, expressed as a percentage of shaft design speed, is shown as a function of the ratio of P30 to a value ΔP20. The value ΔP20 is a normalizing parameter based on the Buckingham Pie theorem/principle, which in this embodiment is equal to P20/14.696.

As shown in FIG. 6, the solid line 602 represents the true estimated correlation between the pressures sensor values P30/ΔP20 and the corrected rotational speed of the shaft (e.g. shaft 20, 21 or 22), NH/√θ20. The model 600 has a first portion 604 that consists of a part of the solid line 602, thereby representing the proper correlation between the pressure sensor values P30/ΔP20 and rotational speed NH of the shaft. In accordance with embodiments of the present invention, however, the model 600 has a second portion 606, represented by the dashed line, that differs from the actual correlation 602. In the second portion 606 of the model 600, the estimated rotational speed NH$_{est}$ of the first model in the second portion is less than a rotational speed of the shaft for the corresponding pressure sensor value Thus, using the model 600 with the adjusted portion or segment 606, the controller 100 operates with an estimated speed value NHest that is lower than the actual speed that would be expected for that pressure value. As a result, the controller 100 can employ control mechanism such as those shown in FIG. 4A, 4B, 4C or 5, using the artificially lowered speed value NHest. Referring to FIG. 4A, for example, the artificially reduced estimated speed NH$_{est}$ moves backward in the model 400 to a lower maximum fuel rate WF$_{max}$. The model 600 is adjusted in very low pressure value areas (e.g. between P30$_1$ and P30$_2$) that are more likely to be associated with shaft failure. This again limits the fuel in the event of a possible shaft break, thereby limiting the risk of disc burst or blade release.

In operation, if the speed sensor(s) 124 is/are not operating, then the controller 100 receives a speed sensor fault signal. As a consequence of receiving the fault signal, the controller 100 employs an estimated speed signal $NH_{est}$ for various control operations. To this end, the controller 100 uses the adjusted model 600 of FIG. 6 (with the segment 606) in its various control schemes.

For example, the controller 100 performs the maximum fuel limit control such as shown in FIG. 4B, or the operations of FIG. 5, using the estimated value $NH_{est}$. In the event of the shaft breakage, the pressure P30 will rapidly decrease into the zone between $P30_1$ and $P30_2$. In that zone, the controller 100 will use an estimated speed $NH_{est}$ that is below what would normally be expected for the pressure level value. As a consequence, for example, the controller 100 executing the operations of FIG. 5 will use an $NH/\sqrt{\theta 20}$ value with the lower $NH_{est}$ value in determining the derate factor 543. This results in the derate factor more rapidly increasing to 1.0.

As a consequence, the reduction in fuel is accelerated. However, in the event that no shaft failure has occurred and the pressure value P30 recovers to normal levels above $P30_2$, then the controller 100 can resume operating the engine 10 normally without the extreme precautionary measure of shutting the engine down completely, as would traditionally occur when a shaft break is detected.

It will be appreciated that the above-described embodiments are merely illustrative, and that those of ordinary skill in the art may readily devise their own implementations and modifications that incorporate the principles of the present invention and fall within the spirit and scope thereof. For example, the current disclosure is presented with respect to a three spool gas turbine engine, but the concepts and descriptions of the inventions are equally applicable to two spool and single spool gas turbine engines, as would be understood by one of ordinary skill in the art.

We claim:

1. A method for use in a turbine control system, the method comprising:
   a) controlling fuel supply to a gas turbine engine at least in part using a fuel supply limit determined as a first function of a rotational speed of a shaft of the gas turbine engine.
   b) obtaining a first value representative of a rotational speed of the shaft;
   c) differentiating the first value within a processing unit;
   d) employing the processing unit to determine an adjusted fuel supply limit as an adjusted function of the first value, the adjusted function based on the first function and the differentiated first value; and
   e) controlling the fuel supply to the gas turbine engine at least in part using the adjusted fuel supply limit.

2. The method of claim 1, wherein step d) further comprises:
   d1) determining an adjustment value based on the differentiated first value;
   d2) determining the adjusted fuel supply limit as a function of a combination of the adjustment value and the first value.

3. The method of claim 1 wherein step b) further comprises obtaining the first value based on a speed sensor value.

4. The method of claim 1, wherein step b) further comprises:
   b1) obtaining at least one pressure sensor value representative of pressure differential through at least one compressor;
   b2) using a first model to determine the rotational speed based on the at least one pressure sensor value, where the first model has a first portion that represents a correlation between pressure sensor value and rotational speed and a second portion that differs from the correlation.

5. The method of claim 4, wherein the first model is further configured such that the rotational speed of the first model in the second portion is less than a rotational speed of the shaft that correlates to the corresponding pressure sensor value.

6. A method for use in a turbine control system, the method comprising:
   a) obtaining at least one pressure sensor value representative of pressure differential through at least one compressor of a gas turbine engine;
   b) using a first model to determine an estimated rotational speed of a shaft of the gas turbine engine based on the at least one pressure sensor value, where the first model has a first portion that represents a correlation between pressure sensor value and rotational speed of the shaft, and a second portion that differs from the correlation, such that the estimated rotational speed of the first model in the second portion is less than a rotational speed of the shaft for the corresponding pressure sensor value; and
   c) determining a fuel supply limit as a function of estimated the rotational speed; and
   d) controlling fuel supply to a turbine at least in part using the fuel supply limit.

7. The method of claim 6, further comprising, prior to step a)
   i) determining a first fuel supply limit as a function of a value from a rotational speed sensor;
   ii) controlling fuel supply to a turbine at least in part using the fuel supply limit; and
   iii) responsive to receiving a signal indicating a fault of the rotational speed sensor, performing steps a, b, c and d.

8. The method of claim 6, further comprising storing information defining the first model in a memory device.

9. A method for use in a turbine control system, the method comprising:
   a) controlling fuel supply to a gas turbine engine based on a plurality of sensed values to generate a fuel supply value;
   b) obtaining a differential temperature value representative of a difference between an expected temperature at an exit of a compressor of a gas turbine engine and a measured temperature at the exit;
   c) generating a derate value if the differential temperature value exceeds a first threshold, the derate value determined as a function of the differential temperature value, wherein the derate value increases at a first average rate as a function of the differential temperature value when the differential temperature value is less than a second threshold, the derate value increases at a second average rate less than the first average rate when the differential temperature value is greater than the second threshold and less than a third threshold, and the derate value increases at a third average rate greater than the second average rate when the differential temperature value is greater than the third threshold;

d) using a controller to reduce the fuel supply value based at least in part on the derate value.

10. The method of claim 9, wherein the third threshold corresponds to a threshold differential temperature value that exceeds differential temperature values associated with restart of the gas turbine engine after shutdown or flameout.

11. The method of claim 9, wherein the second average rate is substantially zero.

12. The method of claim 9, wherein step d) further comprises using a controller to reduce the fuel supply value further based on a value representative of a rotational speed of a shaft of the gas turbine engine.

13. The method of claim 12, wherein step d) further comprises obtaining the value representative of the rotational speed from a speed sensor.

14. The method of claim 12, wherein step d) further comprises obtaining the value representative of the rotational speed:
   obtaining at least one pressure sensor value representative of pressure differential through at least one compressor;
   using a first model to determine the rotational speed based on the at least one pressure sensor value, where the first model has a first portion that represents an correlation between pressure sensor value and rotational speed and a second portion that differs from the correlation.

* * * * *